US009991015B2

(12) United States Patent
Filo

(10) Patent No.: US 9,991,015 B2
(45) Date of Patent: Jun. 5, 2018

(54) WIRE FOR ELECTRIC FENCING LINES AND ELECTRIC FENCING LINES MADE FROM SUCH WIRES

(71) Applicant: NV Bekaert SA, Zwevegem (BE)

(72) Inventor: Jozef Filo, Zbehy (SK)

(73) Assignee: NV BEKAERT SA, Zwevegem (BE)

( * ) Notice: Subject to any disclaimer, the term of this patent is extended or adjusted under 35 U.S.C. 154(b) by 0 days. days.

(21) Appl. No.: 15/541,130

(22) PCT Filed: Jan. 14, 2016

(86) PCT No.: PCT/EP2016/050662
§ 371 (c)(1),
(2) Date: Jun. 30, 2017

(87) PCT Pub. No.: WO2016/116350
PCT Pub. Date: Jul. 28, 2016

(65) Prior Publication Data

US 2017/0372810 A1 Dec. 28, 2017

(30) Foreign Application Priority Data

Jan. 21, 2015 (EP) .................................... 15151874

(51) Int. Cl.
*H01B 5/08* (2006.01)
*A01K 3/00* (2006.01)
*H01B 1/02* (2006.01)
*H01B 5/00* (2006.01)
*H01B 5/12* (2006.01)

(52) U.S. Cl.
CPC ............ *H01B 1/023* (2013.01); *H01B 5/008* (2013.01); *H01B 5/12* (2013.01)

(58) Field of Classification Search
CPC ........... H01B 1/023; H01B 5/008; H01B 5/12
USPC .................. 174/117 F, 117 M, 128.1; 256/10
See application file for complete search history.

(56) References Cited

U.S. PATENT DOCUMENTS

| | | | | |
|---|---|---|---|---|
| 4,355,201 A * | 10/1982 | Wilson, Sr. | H01B 17/145 174/158 F |
| 5,036,166 A | 7/1991 | Monopoli | |
| 6,264,173 B1 * | 7/2001 | Badger | A01K 3/005 256/10 |
| 2010/0154344 A1 * | 6/2010 | Amils | D07B 1/068 52/649.1 |
| 2012/0177940 A1 * | 7/2012 | Cheng | D07B 1/062 428/592 |

FOREIGN PATENT DOCUMENTS

| | | |
|---|---|---|
| DE | 93 06 124 | 6/1993 |
| GB | 2 321 762 | 5/1998 |
| WO | 2005/091308 | 9/2005 |

OTHER PUBLICATIONS

International Search Report dated Mar. 3, 2016 in International (PCT) Application No. PCT/EP2016/050662.

* cited by examiner

*Primary Examiner* — Sherman Ng
(74) *Attorney, Agent, or Firm* — Wenderoth, Lind & Ponack, L.L.P.

(57) ABSTRACT

A use of a carbon steel wire for electric fencing lines, said carbon steel wire having a corrosion resistant coating, wherein the carbon content of said carbon steel wire is below 0.20 wt % and said corrosion resistant coating is zinc aluminum alloy or zinc aluminum magnesium alloy coating with a coating weight in the range of 30 to 100 g/m$^2$.

14 Claims, 1 Drawing Sheet

WIRE FOR ELECTRIC FENCING LINES AND ELECTRIC FENCING LINES MADE FROM SUCH WIRES

TECHNICAL FIELD

Figure 1:
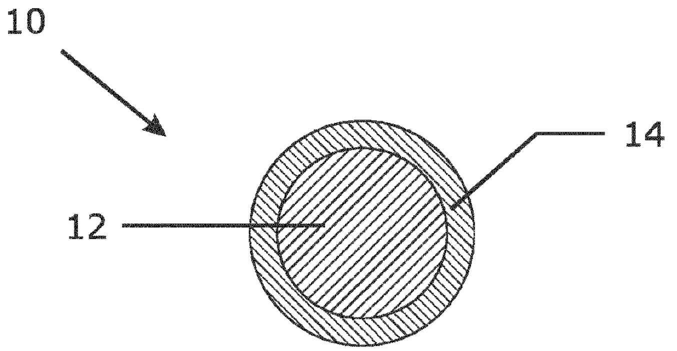

The present invention relates to electrically conducting wires for electric fencing lines and electric fencing lines made from such wires.

BACKGROUND ART

Electric fencing lines are commonly employed for confining livestock, e.g. cattle, sheep and horse on grazing land and as a protection against wild animals. The electric fencing lines are fencing flexes consisting of non-conducting filaments, especially plastic filaments, and one or more conducting wires which have been incorporated into the flexes. The electric fencing lines cannot harm livestock by cutting them and are also more visible for them.

Such electric fencing lines are connected at one of their ends to a high-voltage electrical energizer. The electric fencing lines themselves may extend several hundreds of meters from the high-voltage energizer. Therefore, such electric fencing lines must have a relatively low internal electrical resistance. In addition, they must possess considerable mechanical strength to accommodate the tensile forces exerted on the fencing lines as they are strung on insulated poles. Further, such electric fencing lines must be of sufficient strength to absorb the tensile forces exerted on the lines in the event that an animal runs into the lines.

A pulsed electric current is sent along the conducting wires, about one pulse per second, from an energizer which is grounded. When an animal, e.g. a horse, touches the fence it completes the circuit between the fence and the ground and receives a short, sharp but safe shock. The shock is sufficiently memorable that the animal never forgets. The electric fencing lines may also be used to subdivide pastures temporarily to insure that they are grazed uniformly, in which case the electric fencing construction may be taken down and restrung every few days forcing animals to graze different strips of land in regular rotation.

U.S. Pat. No. 5,036,166 discloses several commercially available electric fencing lines. The fencing lines thereof comprise two different types of wires: stainless steel wires and copper wires. Stainless steel wires are rust-resistant and acid-resistant and have relatively high tensile strength; therefore they serve to take up the tensile strength. On the other hand, since stainless steel wires have a relatively low electrical conductivity, copper wires with small diameter are used to provide good electrical conductivity.

GB2321762 discloses a flexible electric fence wherein only one kind of electrically conducting wires is deployed. The electrically conducting wires are made of unalloyed steel wires and have a corrosion resistant, electrically conducting coating, e.g. cladded copper. It is further disclosed that the electrical resistance of a copper-cladded unalloyed steel wire is even from 10 to 17 times lower than that of a stainless steel wire has a same diameter.

The electrical resistance of the electric fencing lines can be adjusted or limited by incorporation of copper wires or deployment of copper-cladded wires. However, the lifetime of the electric fencing lines remains a challenge.

DISCLOSURE OF INVENTION

It is an object of the present invention to provide a novel electrically conducting wire suitable for electric fencing lines.

It is a further object of this invention to provide electric fencing lines having prolonged life time and low cost.

According to the first respect of the present invention, there is provided a use of a carbon steel wire for electric fencing lines, said carbon steel wire having a corrosion resistant coating, wherein the carbon content of said carbon steel wire is below 0.20 wt % and said corrosion resistant coating is zinc aluminium alloy or zinc aluminium magnesium alloy coating with a coating weight in the range of 30 to 100 g/m$^2$.

The low carbon steel wire has a higher electrical conductivity than the stainless steel wires with a same diameter. The carbon steel wire according to the present invention has carbon content below 0.20 wt %, preferably below 0.05 wt % and more preferably below 0.03 wt %. The application of the low carbon steel wire in an electric fencing line can serve as a tension member on the one hand, and on the other hand it can provide considerable electric conductivity to the fencing line, therefore the application of conductive wires like copper wires can be omitted or at least the deployment of copper wires can be reduced.

According to the present invention, the carbon steel wire is coated with zinc aluminium alloy or zinc aluminium magnesium alloy. Zinc aluminium alloy or zinc aluminium magnesium alloy coating provides much better corrosion resistant to steel wire than traditional zinc coating. Importantly, zinc aluminium alloy or zinc aluminium magnesium alloy coating can be conventionally applied by hot dipping or electro-plating. The thicker the coating is, the longer time the carbon steel wire is protected, provided that the coating is homogeneously coated and stayed on the carbon steel wire. Also, heavily coated carbon steel wire can provide better conductivity which is beneficial as a conductive wire for electrical fencing lines. As disclosed in GB2321762, an unalloyed carbon steel wire cladded with copper layer, which should be rather thick, can provide sufficient electrical conductivity an electrically conducting fence. Copper is good in electrical conductivity but is not a good corrosion resistant material. In contrast herewith, zinc aluminium alloy or zinc aluminium magnesium alloy is a good corrosion resistant material and the coating can prevent the carbon steel wire from corrosion and provides electrical conductivity. Moreover, the coating weight of the zinc aluminium alloy or zinc aluminium magnesium alloy coating according to the present invention is in the range of 30 to 100 g/m$^2$. Preferably, the coating weight is in the range of 40 to 60 g/m$^2$. The thicker coating can provide better corrosion resistance but it would increase the cost of the coated wire. It is found that it is prone to create cracks in the thick coating since it is not able to follow the deformation of the carbon steel wire, e.g. due to the bending of the electric fencing lines. If the thick coating cracks or is locally damaged, corrosion would occur and the wire will be failed with a short life time. On the other hand, it has been found that sun shine is detrimental to the plastic material like polyethylene and an expected life time for plastic based electric fencing line is normally five years. The relatively thin zinc aluminium alloy or zinc aluminium magnesium alloy coating according to the invention is sufficient to prevent the carbon steel wire from corrosion in the industrial application environment for at least five years. Therefore, the zinc aluminium alloy or zinc aluminium magnesium alloy coating with a coating weight in the range of 30 to 100 g/m$^2$ is optimised to provide conductivity and sufficient corrosion resistant to the electrically conducting wires during the life time of the electric fencing lines and at a low cost. In addition, the coated carbon steel wire is much cheaper than the stainless steel wires and copper wires which are commonly used for electric fencing lines.

According to the invention, the aluminium content of said zinc aluminium alloy coating is in the range of 3 to 20 wt %. This composition guarantees good corrosion resistance and adherence to the carbon steel wire. Preferably, the aluminium content of said zinc aluminium alloy coating is 5 wt %. More preferably, the aluminium content of said zinc aluminium alloy or zinc aluminium magnesium alloy coating is 10 wt % since this provides better corrosion protection and electrical conductivity. The magnesium content of said zinc aluminium magnesium alloy coating is in the range of 0.1 to 5 wt %, preferably in the range of 0.1 to 1 wt %, e.g. 0.3 wt % or 0.5 wt %. According to the invention, the aluminium content of said zinc aluminium magnesium alloy coating is in the range of 3 to 8 wt %. The magnesium content of said zinc aluminium magnesium alloy coating is in the range of 0.1 to 5 wt %, preferably in the range of 0.1 to 1 wt %, e.g. 0.3 wt % or 0.5 wt %.

The zinc aluminium alloy or zinc aluminium magnesium alloy coating according to the present invention may contain small amount, e.g. less than 0.1 wt %, less than 0.05 wt % or less than 0.01 wt %, of any one of the following elements: Si, Ni, Ce, La, Sn, Bi, Pb, Cd, Cu, Fe, Ti and Cr.

The carbon steel wire used for electric fencing lines according to the invention has a diameter in the range of 0.1 to 1.0 mm, e.g. in the range of 0.2 to 0.3 mm. Preferably, the carbon steel wire coated with zinc aluminium alloy or zinc aluminium magnesium alloy is a redrawn wire. The redrawing of zinc aluminium alloy or zinc aluminium magnesium alloy coated wire can improve the tensile strength of the coated carbon steel wire and enhance the adhesion between the zinc aluminium alloy (or zinc aluminium magnesium alloy) coating and carbon steel wire. The coated carbon steel wire according to the invention has a tensile strength in the range of 900 to 1250 $N/mm^2$. The specific electrical resistance in the range of $4\times10^{-8}$ to $5.0\times10^{-7}$ Ω·m (i.e. specific electrical resistance in the range of $2\times10^{6}$ to $2.5\times10^{7}$ S/m), preferably $8\times10^{-8}$ to $2.5\times10^{-7}$ Ω·m (i.e. specific electrical resistance in the range of $4\times10^{6}$ to $1.25\times10^{7}$ S/m).

According to the second aspect of the present invention, it is provided an electric fencing line comprising one or more carbon steel wires as described above incorporated in a plastic material. The electric fencing line is in a form of a tape, a rope, a strand or a plaited braid. The electrical fencing lines may have the configuration as illustrated in U.S. Pat. No. 5,036,166 or GB2321762, while the stainless steel wires thereof or both the stainless steel wires and the copper wires thereof are replaced by the coated carbon steel wire according to the present invention. Specifically, the electric fencing line is an electric fencing tape made by plaiting, knitting or weaving one or more the coated carbon steel wire according to the present invention into non-conducting plastic filaments. The non-conducting plastic filaments may be plurality of warp filaments and weft filaments made of polyethylene, polyamide, polyester, polypropylene or other plastic materials. In addition, the electric fencing line may further comprise one or more copper wires being incorporated in the plastic material. The application of copper wires together with the coated carbon steel wires may increase the conductivity of the electric fencing lines.

BRIEF DESCRIPTION OF FIGURES IN THE DRAWINGS

The objects and advantages of the invention will be fully understood from the following more detailed description given by way of example with reference to the accompanying drawing in which:

FIG. 1 shows a schematic view of a coated carbon steel wire used for electric fencing lines according to the invention.

Figure 2:
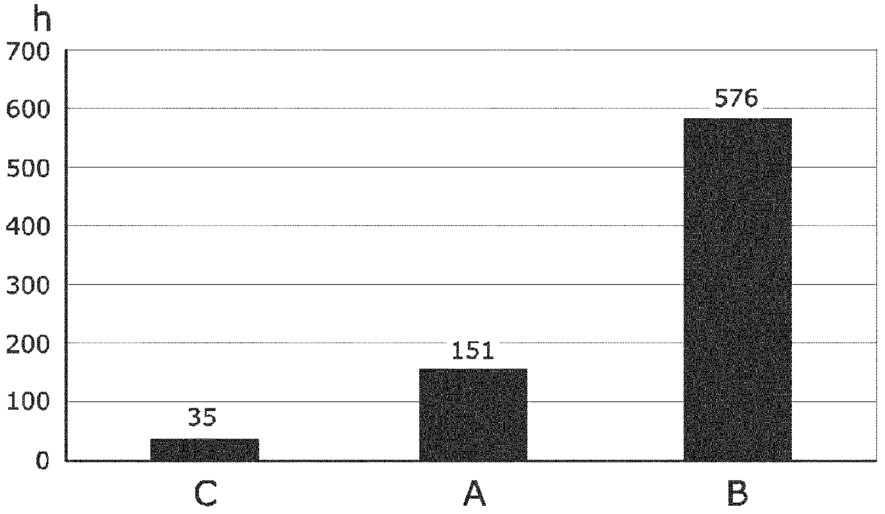

FIG. 2 compares the salt spray testing result for three different types of coated carbon steel wires.

Figure 3:
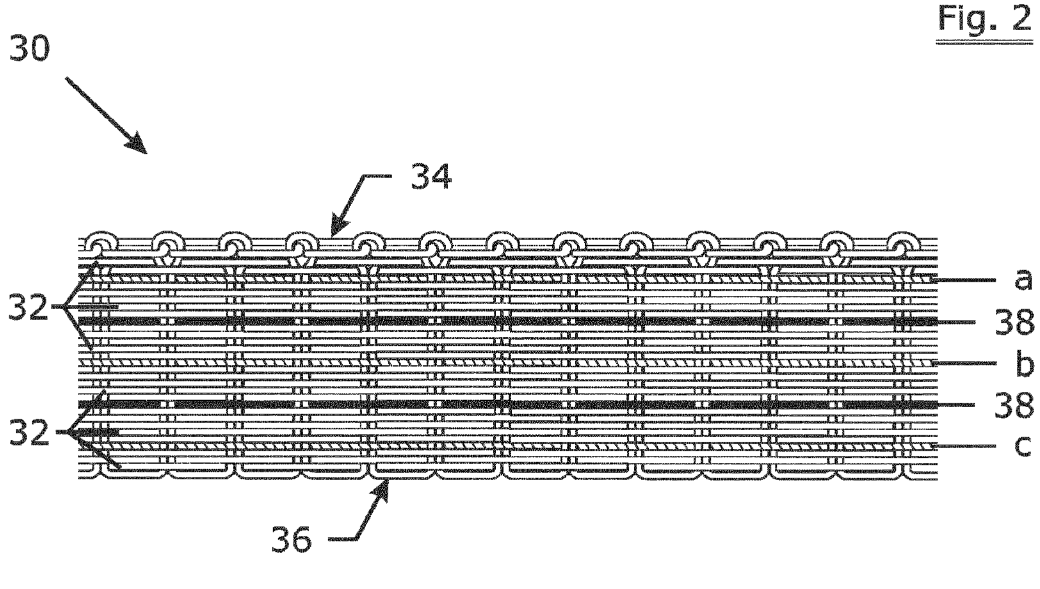

FIG. 3 shows a schematic view of an electric fencing tape according to the invention.

MODE(S) FOR CARRYING OUT THE INVENTION

FIG. 1 shows a schematic view of a coated wire 10 according to the present invention. The coated wire 10 has a carbon steel core 12 and a zinc aluminium alloy coating 14. As an example, a low carbon steel wire having a carbon content of maximum 0.03 wt % and a silicon content of maximum 0.03 wt % was first coated with zinc aluminium alloy by hot dipping. Wire A is coated with zinc/aluminium in 95:5 of weight percent. Wire B is coated with zinc/aluminium in 90:10 of weight percent. The coated wire A and B is further redrawn to a diameter of 0.28 mm.

The corrosion resistance of the coated wire A and B is measured by salt spray testing (ASTM B117/DIN50021/ISO9227). For comparison, a carbon steel wire C with a same steel composition but coated with hot-dipped pure zinc is made as a reference. For the salt-spray testing, the samples were evaluated at 5% dark brown rust (DBR). Wire A, B and C are all redrawn coated wires with a same diameter of 0.28 mm and a similar coating weight of 46 to 48 g/m2. As demonstrated in the results shown in FIG. 2, wire A outperformed zinc coated carbon steel wire C by a factor of about 4, and wire B outperformed zinc coated carbon steel wire C by a factor of about 16. Wire B reaches about 576 hours (h) at 5% DBR. Also, it is noted that all these coatings maintain their corrosion resistance even after heavy deformation and heat exposure.

The tensile strength of wire B is 1080 $N/mm^2$ which is higher than a stainless steel wire having a similar diameter. Also, the elongation performance of wire B is better than the stainless steel wire. The electrical resistance of wire B is 2.16 Ω/m (i.e. specific electrical resistance is $1.33\times10^{-7}$ Ω·m). It indicates that the coated carbon steel wire B is more electrically conductive than stainless steel wire having a similar diameter.

An electric fencing line in a form of tape 30 is illustrated in FIG. 3. The tape is woven from plastic monofilaments 32, e.g. polyethylene. The weaving is of conventional form and providing a selvedge 34, 36 at each edge of the tape. The coated carbon steel wires A or B, indicated by a, b or c in FIG. 3, according to the present invention are interwoven loosely with the plastic monofilaments 32 as warp monofilaments. To increase the conductivity of the electric fencing tape 30, copper wires 38 may be as well loosely interwoven into the tape.

The invention claimed is:

1. An electric fencing line, comprising one or more carbon steel wires incorporated in a plastic material, said one or more carbon steel wire having a corrosion resistant coating, wherein the carbon content of said carbon steel wire is below 0.20 wt % and said corrosion resistant coating is zinc aluminium alloy or zinc aluminium magnesium alloy coating with a coating weight in the range of 30 to 100 $g/m^2$.

2. An electric fencing line as in claim 1, wherein said electric fencing line is in a form of a tape, a rope, a strand or a plaited braid.

3. An electric fencing line as in claim 1, wherein said electric fencing line is an electric fencing tape made by plaiting, knitting or weaving said one or more carbon steel wires into non-conducting plastic filaments.

4. An electric fencing line as in claim 3, wherein said non-conducting plastic filaments are plurality of warp filaments and weft filaments made of polyethylene, polyamide, polyester, polypropylene or other plastic materials.

5. An electric fencing line as in claim 1, wherein said electric fencing line further comprises one or more copper wires being incorporated in the plastic material.

6. An electric fencing line as in claim 1, wherein said zinc aluminium alloy or zinc aluminium magnesium alloy coating has an aluminium content in the range of 3 to 20 wt %.

7. An electric fencing line as in claim 6, wherein the aluminium content of said zinc aluminium alloy or zinc aluminium magnesium alloy coating is 5 wt % or 10 wt %.

8. An electric fencing line as in claim 1, wherein said zinc aluminium magnesium alloy coating has a magnesium content in the range of 0.1 to 5 wt %.

9. An electric fencing line as in claim 1, wherein said carbon steel wire has a carbon content of below 0.05 wt %.

10. An electric fencing line as in claim 1, wherein said zinc aluminium alloy or zinc aluminium magnesium alloy coating has a coating weight in the range of 40 to 60 $g/m^2$.

11. An electric fencing line as in claim 1, wherein said carbon steel wire has a diameter in the range of 0.1 to 1.0 mm.

12. An electric fencing line as in claim 1, wherein said carbon steel wire is a redrawn wire.

13. An electric fencing line as in claim 1, wherein said carbon steel wire has a tensile strength in the range of 900 to 1250 $N/mm^2$.

14. An electric fencing line as in claim 1, wherein the specific electrical resistance of said carbon steel wire is in the range of $4\times10^{-8}$ to $5.0\times10^{-7}$ Ω·m.

* * * * *